(12) United States Patent
Morishita (10) Patent No.: US 9,050,892 B2
(45) Date of Patent: Jun. 9, 2015

(54) DIAL OPERATION DEVICE FOR VEHICLE

(75) Inventor: Yuuichirou Morishita, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 648 days.

(21) Appl. No.: 13/202,718

(22) PCT Filed: Jan. 28, 2010

(86) PCT No.: PCT/JP2010/051096
§ 371 (c)(1),
(2), (4) Date: Aug. 22, 2011

(87) PCT Pub. No.: WO2010/106835
PCT Pub. Date: Sep. 23, 2010

(65) Prior Publication Data
US 2011/0303514 A1 Dec. 15, 2011

(30) Foreign Application Priority Data
Mar. 19, 2009 (JP) ................................. 2009-068312

(51) Int. Cl.
*H01H 19/00* (2006.01)
*B60K 37/06* (2006.01)
(Continued)

(52) U.S. Cl.
CPC ............ *B60K 37/06* (2013.01); *B60H 1/00985* (2013.01); *B60K 2350/302* (2013.01); *H01H 1/5805* (2013.01); *H01H 19/04* (2013.01); *H01H 19/08* (2013.01); *H01H 2223/054* (2013.01); *H01H 2231/026* (2013.01)

(58) Field of Classification Search
CPC ............... B60H 1/00985; B60K 37/06; B60K 2350/302; H01H 19/04; H01H 2231/026; H01H 2223/054; H01H 1/5805

USPC .......................................... 361/781, 822, 823
See application file for complete search history.

(56) References Cited

U.S. PATENT DOCUMENTS 4,891,476 A * 1/1990 Nation et al. ................ 200/11 R
5,049,709 A * 9/1991 Prickett et al. ................ 200/527
(Continued)

FOREIGN PATENT DOCUMENTS

JP    A-3-175688    7/1991
JP    A-11-45632    2/1999
(Continued)

OTHER PUBLICATIONS

Mar. 2, 2010 International Search Report issued in International Application No. PCT/JP2010/051096.

*Primary Examiner* — David M Sinclair
*Assistant Examiner* — Theron Milliser
(74) *Attorney, Agent, or Firm* — Oliff PLC (57) ABSTRACT

A dial operation device for a vehicle including a plurality of dial devices each having a dial knob and a dial element outputting a signal corresponding to a turned position of the dial knob, a plurality of circuit boards on which the dial devices are mounted, wiring members electrically interconnecting the circuit boards, and a board supporting body having a panel with a plurality of through-holes for inserting the dial devices therethrough and individually supporting the circuit boards such that the dial knobs protrude toward a front of the panel through the through-holes, wherein the circuit boards are supported in the body such that at least one of the circuit boards is positioned out of a plane of another one of the circuit boards.

11 Claims, 7 Drawing Sheets

(51) Int. Cl.
  *B60H 1/00* (2006.01)
  *H01H 19/04* (2006.01)
  *H01H 19/08* (2006.01)
  *H01H 1/58* (2006.01)

(56) References Cited

U.S. PATENT DOCUMENTS 5,155,664 A * 10/1992 Holterman et al. ........ 361/679.6
5,537,300 A * 7/1996 Kraines et al. ................. 362/86
5,838,221 A * 11/1998 Jones et al. .................... 338/152
5,861,589 A * 1/1999 Sato et al. ..................... 200/5 R
6,223,610 B1 * 5/2001 Ishiguro et al. ............... 74/10.41
6,521,848 B2 * 2/2003 Shibata et al. ................ 200/5 R
7,811,160 B2 * 10/2010 Ogawa et al. ................. 454/121
2004/0173691 A1 * 9/2004 Hall ............................ 236/91 D

FOREIGN PATENT DOCUMENTS

| JP | A-11-307898 | 11/1999 |
| JP | A-2001-229780 | 8/2001 |
| JP | A-2001-291451 | 10/2001 |
| JP | A-2004-224192 | 8/2004 |
| JP | A-2008-226052 | 9/2008 |

* cited by examiner

DIAL OPERATION DEVICE FOR VEHICLE

CROSS-REFERENCE TO RELATED APPLICATIONS

This is a national stage application filed under 35 U.S.C. §371 claiming priority to International Application No. PCT/JP2010/051096 filed in Japan on Jan. 28, 2010, which claims priority to Japanese Application No. JP2009-068312 filed in Japan on Mar. 19, 2009, the disclosures of which are incorporated herein by reference in their entireties.

BACKGROUND

Exemplary embodiments provided herein relate to a dial operation device including a plurality of dials for use in a vehicle, such as an automobile.

A related art dial operation device equipped to a vehicle is described in, for example, JP-A-2001-229780, and includes a plurality of dial devices mounted on a common circuit board (e.g., a printed circuit board as described in this document).

Figure 6:
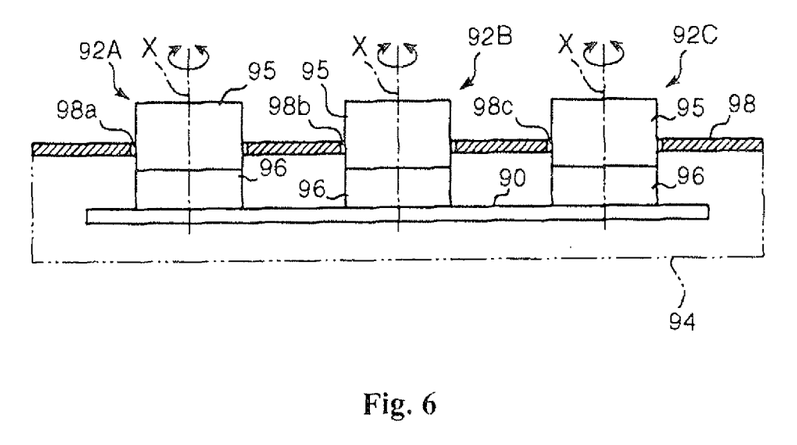
FIG. 6 is a cross section schematically showing a dial operation device in the related art.

FIG. 6 schematically shows a device of this type. The operation device shown in FIG. 6 includes a circuit board 90 on which electric circuits are installed, a plurality of dial devices 92A, 92B, and 92C mounted on the circuit board, and a board supporting body 94 supporting the circuit board 90. The dial devices 92A, 92B, and 92C each have a dial knob 95 that turns and a dial element 96 detecting a turned position of the dial knob 95 and outputting a signal corresponding to the detected position. The board supporting body 94 includes a panel 98 positioned in front of the printed circuit board 90. The panel 98 is provided with a plurality of through-holes 98a, 98b, and 98c in which the dial devices 92A, 92B, and 92C, respectively, are inserted. The circuit board 90 is supported on the board supporting body 94 in such a manner that the dial knobs 95 of the respective dial devices 92A through 92C protrude frontward from the panel 98 from behind, through the through-holes 98a through 98c, respectively.

In an operation device in which a plurality of the dial devices 92A through 92C are mounted on a single circuit board 90 in this manner, it is desirable to use dial devices having the same shape and the same structure to save cost. This approach may be difficult, however, with certain panel shapes.

More specifically, dial devices all having the same shape and structure, such as dial devices 92A through 92C, may be used in panels in which the surface of the panel lies in a plane orthogonal to the turning axes X of the dials, such as shown in FIG. 6. However, in some panels, the surface of the panel 98 rises and falls in a direction parallel to the turning axes X due to design choice and/or for other reasons. When dial devices having the same shape are used as the dial devices 92A through 92C in circumstances where the positions of the corresponding through-holes 98a through 98c are different in a direction parallel to the turning axes X because of the rise and fall in the panel, the amount of the dial knobs 95 protruding frontward from the panel surface through the corresponding through-holes 98a through 98c may differ considerably. These differences in the amount of protrusion of the dial knobs from the panel can degrade the appearance of the device and can make it difficult to grasp the dial knobs.

Figure 7:
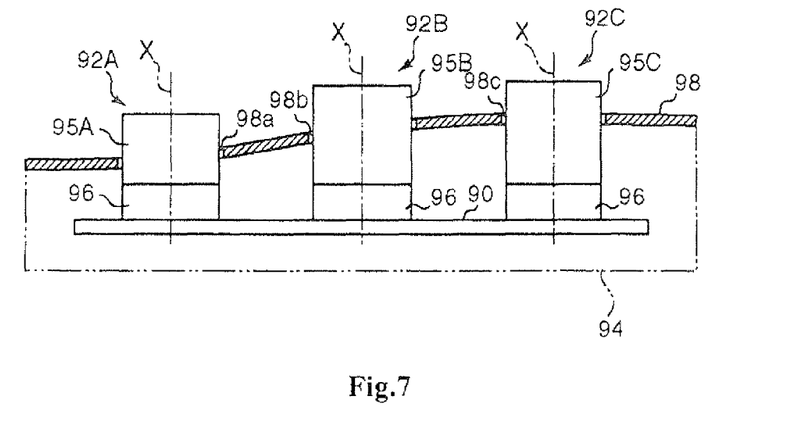
FIG. 7 is a cross section schematically showing a dial operation device for reference.

In such an application, in order to make the protruding amounts of the respective dial knobs 95 equal regardless of the rise and fall on the surface of the panel 98, dial devices having dial knobs 95 of differing heights can be used to accommodate the rise and fall of the surface or the panel 98, such as the dial devices 92A, 92B and 92C shown in FIG. 7. As a result, the number of types of required dial devices is increased, and consequently the cost.

Conversely, there may be circumstances where the surface of the panel 98 lies in a plane without any rise and fall, but it may be desirable to set different protrusion amounts for the dial knobs 95 of the respective dial devices 92A, 92B, and 92C depending on the positions of these dial devices or a desired operational effect. In such a case, the shape and structure for all of the dials cannot be standardized.

SUMMARY

The exemplary embodiment described herein provides a dial operation device for a vehicle that allows for protrusion distances of dial knobs of respective dial devices to be set to predetermined amounts to accommodate a panel having a non-planar face, such that all dial knobs of the device can have the same shape and structure to save costs. A dial operation device according to the exemplary embodiment can include a plurality of dial devices each having a dial knob and a dial element outputting a signal corresponding to a turned position of the dial knob, a plurality of plate-shaped circuit boards divided for the respective dial devices onto which the corresponding dial devices are mounted, wiring members electrically interconnecting the circuit boards, and a board supporting body having a panel provided with a plurality of through-holes in which the corresponding dial knobs of the respective dial devices are inserted and which supports the respective circuit boards individually in a state where the respective dial knobs protrude toward a front of the panel through the corresponding through-holes in the panel. The board supporting body supports the respective circuit boards in such a manner that one of at least two circuit boards among the plurality of circuit boards is positioned out of a plane of the other of the plurality of circuit boards.

DETAILED DESCRIPTION OF THE EMBODIMENTS

Referring to FIGS. 1-5, the exemplary embodiment of the dial operation device is described with reference to an air-conditioning apparatus (e.g., air conditioner) installed in a vehicle. It should be appreciated, however, that the exemplary embodiment of the dial operation device described herein can be used with other devices, such as an audio device, a room lighting device, etc.

The dial operation device shown in FIG. 1 through FIG. 5 includes a plurality of (e.g., three as shown herein) dial devices 10D, 10R, and 10P, plate-shaped or "planar" circuit boards 12D, 12R, and 12P on which the dial devices 10D, 10R, and 10P are mounted, respectively, and a board supporting body supporting the circuit boards 12D, 12R, and 12P. More specifically, in this dial operation device, a circuit board on which the respective dial devices 10D, 10R, and 10P are mounted is divided for the individual dial devices, and the divided circuit boards are supported on a common board supporting body. The board supporting body has a panel 14 facing the vehicle interior and a rear cover 16 disposed on the back side of the panel 14. The rear cover 16, in a state holding the respective circuit boards 12D, 12R, and 12P, is joined to the panel 14. In this embodiment, rubber sheets 15A and 15B are interposed between the panel 14 and the circuit boards 12D, 12R, and 12P.

One advantage of the exemplary embodiment is that dial devices of the same shape and the same structure can be used as the dial devices 10D, 10R, and 10P. The dial devices 10D, 10R, and 10P each have a cylindrical dial knob 18 that turns and a dial element 20 supporting the dial knob 18 that is rotatable about a turning axis X, which is the center axis of the dial knob 18. The dial element 20 is mounted on the corresponding circuit board in a posture such that the turning axis X coincides with a normal direction to the circuit board. The dial element 20 detects a turned position of the dial knob 18 and outputs a signal corresponding to the detected position to an internal circuit of the circuit board on which the dial element 20 is mounted.

Of the dial devices 10D, 10R, and 10P, the dial device 10D turns, for example, to adjust conditioned air sent from the air-conditioning apparatus toward the driver's seat. Meanwhile, the dial devices 10R and 10P turn, for example, to adjust conditioned air sent from the air-conditioning apparatus to seats other than the driver's seat, such as the rear seats and the passenger seat, respectively. The dial devices 10D, 10R, and 10P of this embodiment can be turned to adjust the air temperature. It should be appreciated, however, that at least one of the dial devices can be turned to adjust the volume of air.

In this embodiment, the respective circuit boards 12D, 12R, and 12P are supported on the board supporting body in a posture parallel to one another (i.e., a posture such that the turning axes X of the respective dial devices 10D, 10R, and 10P are parallel to one another) so that the dial knobs 18 of the respective dial devices 10D, 10R, and 10P are aligned in a horizontal direction. It should be appreciated, however, that the number of the dial devices and the circuit boards and this specific arrangement are provided as an example and are not intended to be limiting. For example, four or more dial devices may be aligned in a matrix. Alternatively, the turning axes of particular dial devices may be inclined with respect to each other.

The panel 14 forming the board supporting body has a plurality of through-holes 14d, 14r, and 14p for the dial devices 10D, 10R, and 10P, respectively. The through-holes 14d, 14r, and 14p are each shaped (e.g., in this embodiment, circles having equal diameters) to allow the dial knob 18 of the corresponding dial device to insert therein from back to front.

Further, a plurality of mode switching buttons 22 that can be depressed to switch air-conditioning modes, for example, are arranged on the periphery of the through-hole 14d corresponding to the dial device 10D for the driver's seat. Also arranged in the vicinity thereof is an air volume setting seesaw button 23 that is depressed when setting a common air volume for the driver's seat and the passenger seat, a power supply button 24 for switching a power supply "ON" and "OFF", and a plurality of indicators 26 for indicating an air volume. In the vicinity of the through-hole 14r corresponding to the dial device 10R for the rear seats, an air volume setting button 27 is arranged for setting a volume of air for the rear seats independently of the driver's seat, as well as indicators 28 to indicate an air volume. Mounted on the the circuit board 12D correspondingly to these buttons are a plurality of depressable switch elements 32, a pair of depressable switch elements 33, and a depressable switch element 34 (FIG. 4) that output signals when the mode switching button 22, the air volume setting seesaw button 23, and the power supply button 24 are depressed, respectively, and a plurality of light emitting elements 36 that illuminate the corresponding indicators 26. Likewise, mounted on the circuit board 12R are a pair of depressable switch elements 37 that output signals when the air volume setting button 27 is depressed, and a plurality of light emitting elements 38 that illuminate the corresponding indicators 28.

In other words, in addition to the dial device 10D for adjusting a temperature of air supplied to the driver's seat, other operational devices and switches may be mounted on the circuit board 12D for controlling other functions of the air conditioning apparatus.

Further, the communication and power supply input portions provided on the circuit boards 12D, 12R and 12P by way of example only, and the device is not intended to be limited to such an arrangement. The communication portion enables communications collectively between the respective circuit boards 12D, 12R, and 12P and to an external circuit provided on the outside of the dial operation device for the vehicle (e.g., a circuit installed in the vehicle). The power supply input portion collectively connects the respective circuit boards 12D, 12R, and 12P to a power supply circuit for the circuit boards.

Figure 1:
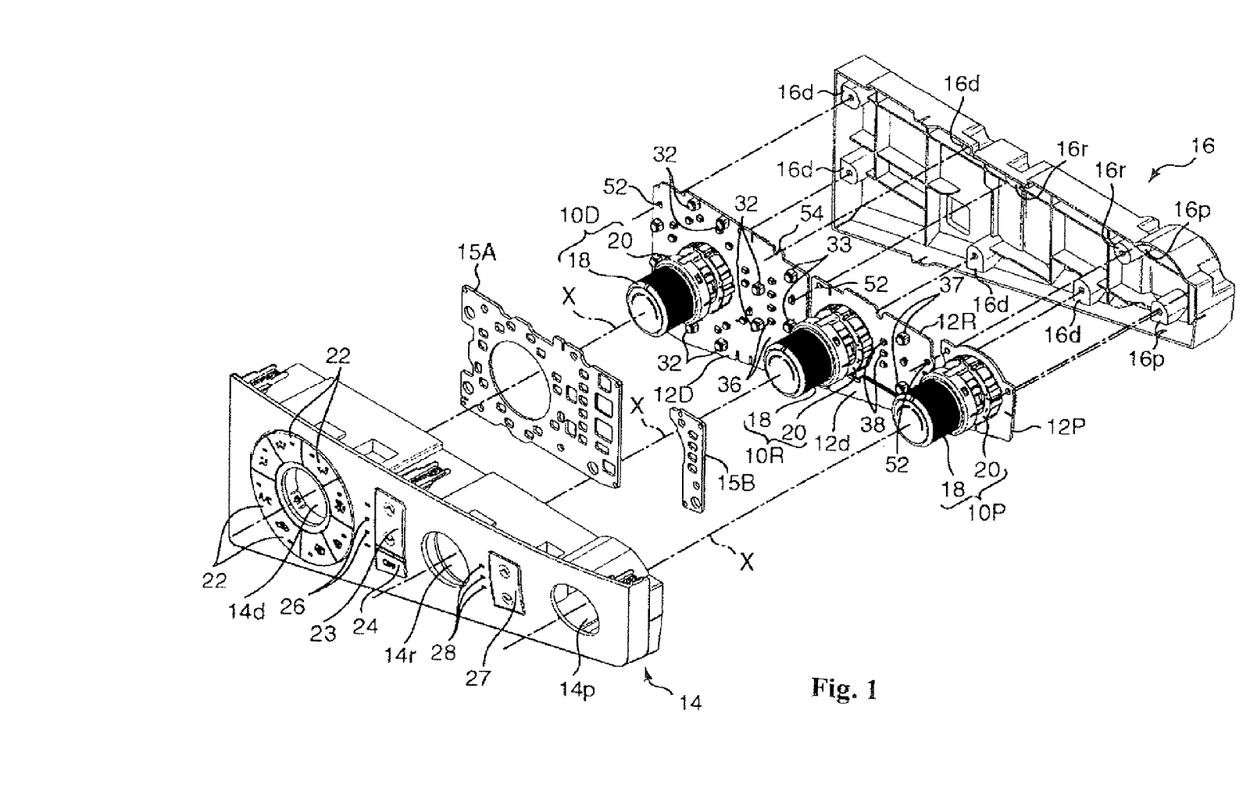
FIG. 1 is an exploded perspective view of a dial operation device for a vehicle according to one embodiment.
Figure 2:
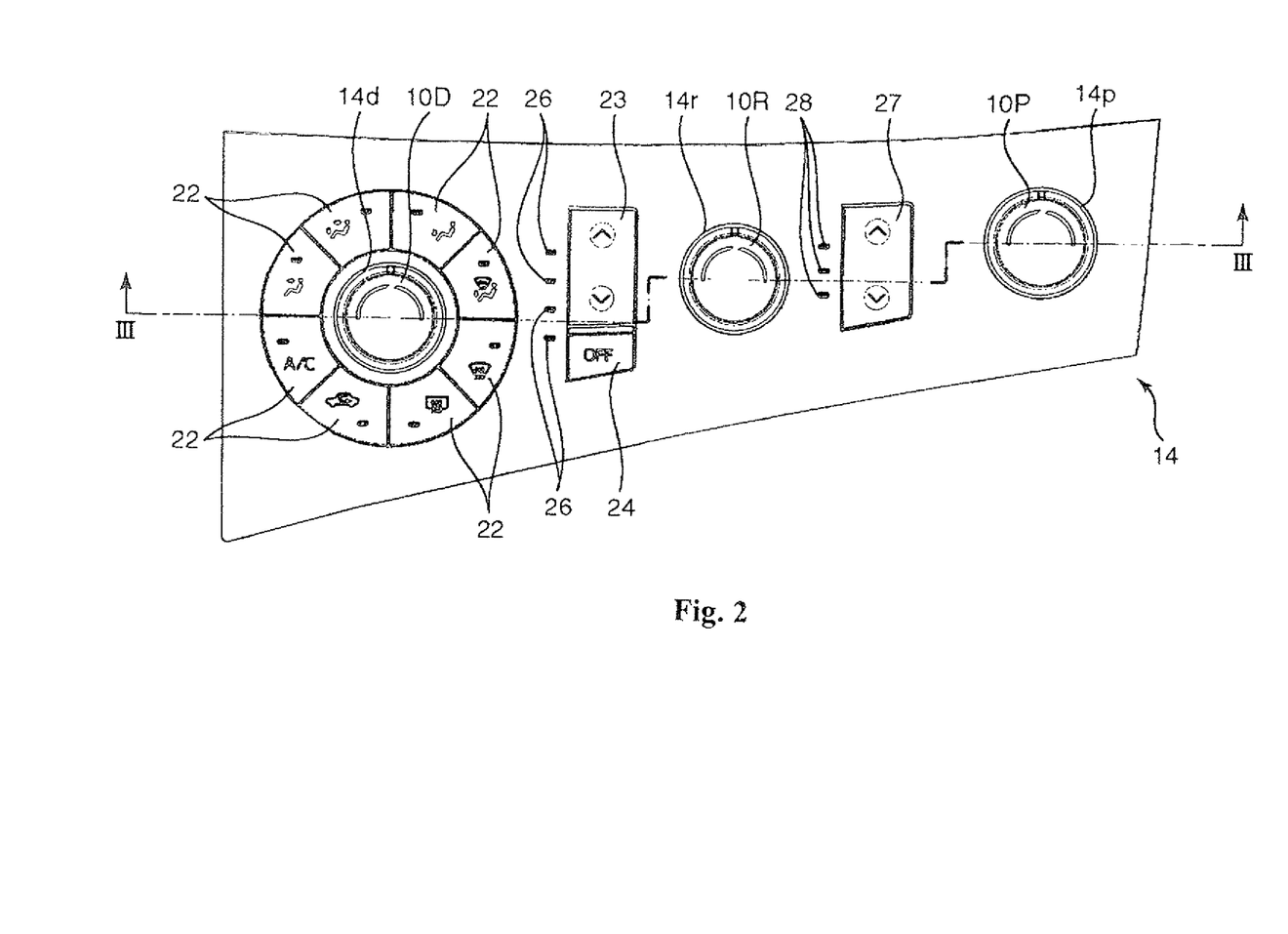
FIG. 2 is a front elevation view of the dial operation device for a vehicle.
Figure 3:
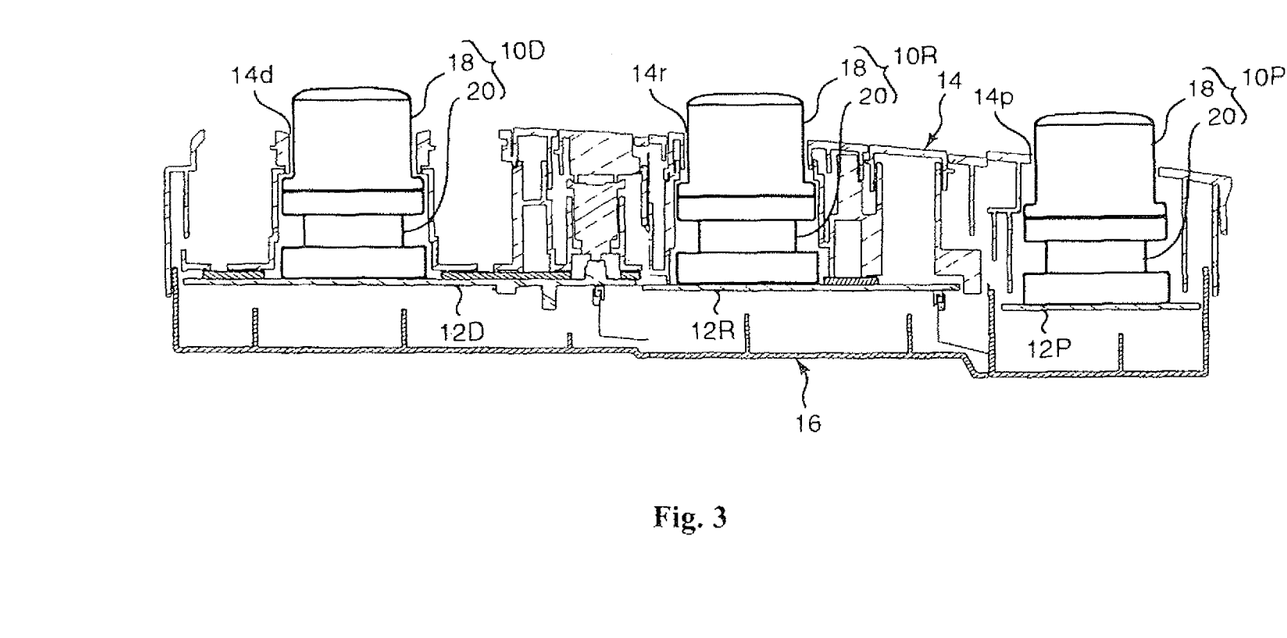
FIG. 3 is a cross section taken along line III-III of FIG. 2.
Figure 4:
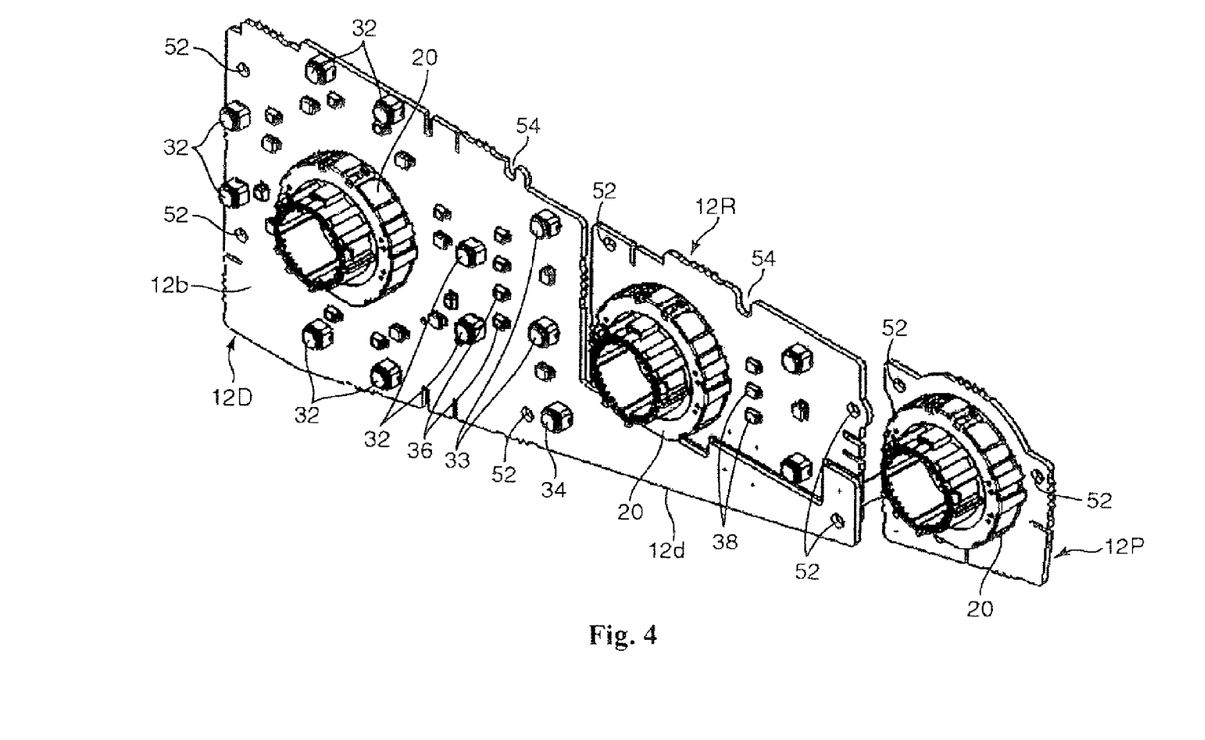
FIG. 4 is a perspective view of a plurality of circuit boards arranged in the dial operation device for a vehicle when viewed from the front.
Figure 5:
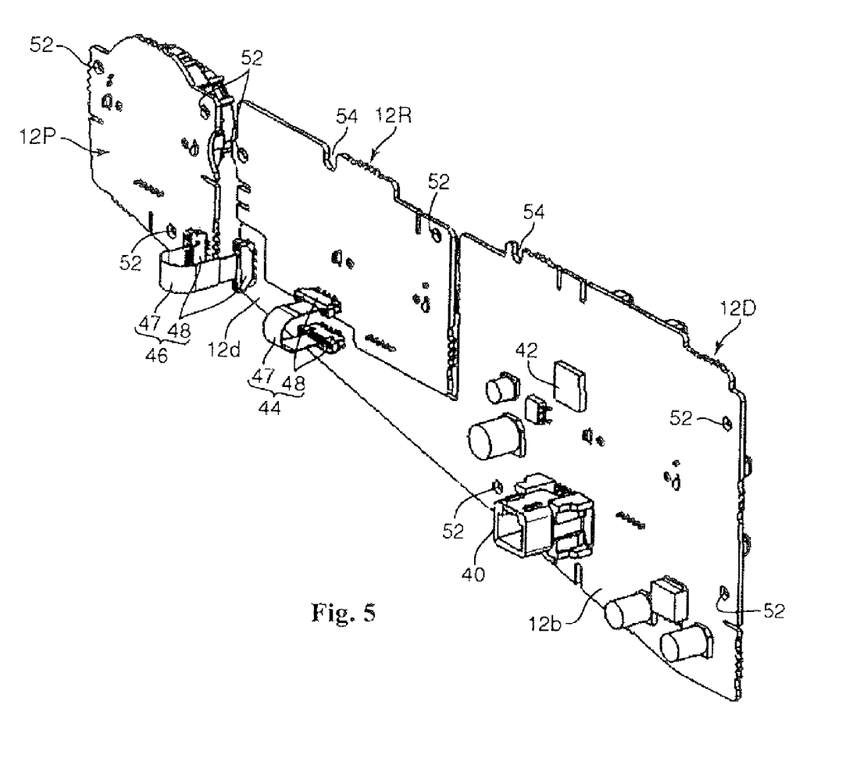
FIG. 5 is a perspective view of the circuit boards when viewed from the back.

More specifically, in this embodiment, a connector 40 for an external connection and a circuit element 42 for communication control are shown in FIG. 5 mounted on the back surface of the circuit board 12D as the communication portion and the power supply input portion, respectively.

The connector 40 for the external connection may be a connector that can be joined to a mating connector provided to an unillustrated wire harness for a vehicle, and can include a power supply input terminal connected to a feed line in the wire harness for the vehicle when joined, and a signal terminal connected to a communication signal line in the wire harness for the vehicle when joined. The connector 40 for the external connection is shown mounted on the back surface of the circuit board 12D so that the power supply input terminal and the signal terminal are electrically connected, respectively, to a feed circuit and a communication circuit included in the circuit board 12D. Thus, the connector 40 for the external connection can serve as a connector forming the power supply input portion and also as a connector forming the communication portion.

The circuit element 42 for communication control can be formed of an IC chip or the like, and can be provided in the communication circuit included in the circuit board 12D. The circuit element 42 can perform communication control collectively between the circuit board 12D and the external circuit connected to the communication terminal of the connector 40 for external connection, and further between the respective circuit boards 12R and 12P and the external circuit.

The main circuit board 12D is shown connected to the sub-circuit boards 12R and 12P via the wiring members 44 and 46, respectively. The wiring member 44 can include a feed line to electrically connect a feed circuit provided on the circuit board 12D and a feed circuit provided on the circuit board 12R, and a signal line to electrically connect the communication circuit including the communication portion provided on the circuit board 12D and a communication circuit included on the circuit board 12R. Meanwhile, the wiring member 46 can include a feed line to electrically connect the feed circuit provided on the circuit board 12D and a feed circuit provided on the circuit board 12P, and a signal line to electrically connect the communication circuit provided on the circuit board 12D and a communication circuit provided on the circuit board 12P.

Accordingly, the power supply provided to the feed circuit of the circuit board 12D via the connector 40 for the external connection can also be supplied to the feed circuit of the circuit board 12R via the wiring member 44 and to the feed circuit of the circuit board 12P via the wiring member 46. Also, the communication circuits of the respective circuit boards 12D, 12R, and 12P can be interconnected via the wiring members 44 and 46. The group of communication circuits cooperating with one another in this arrangement allows the external circuit to communicate with the circuit board 12D via the connector 40.

The wiring members 44 and 46 can each be formed, for example, by a flat cable 47 and a pair of wiring connectors 48 as shown in FIG. 5. The flat cable 47 can be formed from a plurality of flexible conductors and a sheet of insulating layer covering the conductors, and can have flexibility sufficient to allow a change of relative positions of adjacent circuit boards (e.g., in particular, a change of the relative positions of the circuit boards in a plate thickness direction). The respective wiring connectors 48 can be mounted on the corresponding circuit boards and each can have a shape in which an end of the flat cable 47 is allowed to insert therein. The wiring connectors 48 can hold the ends of the flat cables 47 inserted therein, and can electrically connect the conductors included in the flat cables 47 to circuits included in the circuit boards on which the wiring connectors 48 are mounted.

In this embodiment, in order to make the wiring structure simple, the main circuit board 12D can have an extended portion 12d extending from a main body 12b to the vicinity of the circuit board 12P on the opposite side by passing under the circuit board 12R at the center. The wiring members 44 and 46 can bridge between the extended portion 12d and the circuit board 12R, and between the extended portion 12d and the circuit board 12P, respectively. The extended portion 12d, however, is not required in this embodiment. For example, the device may be configured in such a manner that the main circuit board 12D is connected to the circuit board 12R, which is provided adjacent to the circuit board 12D at the center as a sub-board, via the wiring member 44, while the circuit board 12R is connected to the circuit board 12P, which is provided adjacent to the circuit board 12R as a sub-board, via the wiring member 46.

The rear cover 16 can have a plurality of bosses 16d, 16r, and 16p to support the circuit boards 12D, 12R, and 12P, respectively, from behind. The bosses 16d, 16r, and 16p can each have a supporting surface facing frontward (i.e., toward the circuit boards and the panel) and a screw hole opening frontward. Meanwhile, through-holes 52 or notches 54 are provided on the respective circuit boards 12D, 12R and 12P at positions corresponding to the respective screw holes. Fixing screws can be inserted into the through-holes 52 or the notches 54 from the front and screwed into the respective screw holes so that the circuit boards 12D, 12R, and 12P can be fastened to the bosses 16d, 16r, and 16p, respectively, while the front surfaces (i.e., supporting surfaces) of the bosses 16d, 16r, and 16P can be in contact with the back surfaces of the circuit boards 12D, 12R, and 12P, respectively.

As the rear cover 16, in a state holding the respective circuit boards 12D, 12R, and 12P, is joined to the panel 14 with the rubber sheets 15A and 15B therebetween, the circuit boards 12D, 12R, and 12P can be supported at positions in which the dial knobs 18 of the respective dial devices 10D, 10R, and 10P mounted on the corresponding circuit boards protrude toward the front of the panel 14 as they penetrate through the corresponding through-holes 14d, 14r, and 14p in the panel 14 from behind. The dial knobs 18 of the respective dial devices 10D, 10R, and 10P can therefore be gripped by the driver or another from the front of the panel 14 and turned.

The surface of the panel 14 in the dial operation device in this embodiment doe not lie in a plane orthogonal to the turning axes X of the dial devices 10D, 10R, and 10P, but has a curved surface that rises and falls from a plane in a direction parallel to the turning axes X. The positions of the respective through-holes 14d, 14r, and 14p are thus different from one another in this direction. More specifically, of the through-holes 14d, 14r, and 14p, the through-hole 14d is on the foremost side (i.e., on the vehicle room side or the upper side in FIG. 3), whereas the through-hole 14p is on the innermost side (i.e., the lower side in FIG. 3).

According to this particular shape of the panel 14, if all the dial devices 10D, 10R, and 10P were to be mounted on a common circuit board as in the dial operation device in the related art, then the protrusion amounts of the dial knobs 18 of the respective dial devices 10D, 10R, and 10P with respect to the surface of the panel 14 would differ considerably from one another. This may have a negative impact on the appearance of the dial operation device when viewed from the front of the panel 14, and would affect the ease of operation of the respective dial knobs 18 (i.e., in particular, the ease of operation of the dial knob 18 which would have a small protrusion amount).

In comparison, in the dial operation device shown in FIG. 1 through FIG. 5, the circuit board is divided for the respective dial devices 10D, 10R, and 10P, and the divided circuit boards 12D, 12R, and 12P are individually held by the rear cover 16. It is thus possible to individually set the relative positions of the circuit boards with respect to the panel 14. In this configuration, a satisfactory appearance and ease of dial operation can be ensured regardless of the shape of the panel 14.

More specifically, in this embodiment, the positions of the front surfaces (i.e., supporting surfaces) of the respective bosses 16d, 16r, and 16p of the rear cover 16 can be set so that the minimum protrusion amounts of the dial knobs 18 of the respective dial devices 10P, 10R, and 10P from the surface of the panel 14 (e.g., in FIG. 3, protrusion amounts of the respective dial knobs 18 from the surface of the panel 14 on the left) can have small differences from one another, in comparison with a case where all the circuit boards 12D, 12R, and 12P are positioned along the same plane (i.e., the plane orthogonal to the turning operation axes X) regardless of differences of the positions of the respective through-holes 14d, 14r, and 14p. In other words, the bosses 16d, 16r, and 16p can be set at positions at which the respective circuit boards 12D, 12R, and 12P are held at different positions in the direction specified above. More specifically, positions at which the rear cover 16 holds the respective circuit boards 12D, 12R, and 12P can be set in such a manner that, of the circuit boards 12D, 12R, and 12P, the circuit board 12D can be positioned on the foremost side (i.e., the upper side in FIG. 3) and the circuit board 12P can be positioned on the innermost side (i.e., the lower side in FIG. 3).

In other words, the dial operation device makes it possible to bring all the dial knobs 18 into a satisfactory protrusion state by being able to individually set the relative positions of the respective dial devices with respect to the panel 14, even in circumstances where dial devices of the same shape and the same structure are used as the respective dial devices 10D, 10R, and 10P for cost saving reasons, and the panel 14 has a shape in which the surface rises and falls in a direction parallel to the turning axes X of the respective dial knobs 18. For example, it is thus possible to make the protrusion amounts of the respective dial knobs 18 from the surface of the panel 14 equal to one another. Consequently, a satisfactory appearance can be achieved.

It should be appreciated, however, that individually setting the relative positions of the respective dial devices with respect to the panel is not limited only to making the protrusion amounts of the respective dial knobs equal, as described above. For example, even when the panel surface lies in a plane orthogonal to the turning axes of the respective dial knobs without any rise and fall, the device as configured herein provides the ability to adjust the protrusion amounts of the respective dial knobs with respect to the panel for other reasons as well.

The specific structure of the board supporting body described in connection with the exemplary embodiment is not intended to be limiting. For example, in the dial operation device shown in FIG. 1 through FIG. 5, the respective circuit boards 12D, 12P, and 12R may be fixed to the panel 14.

As described herein, the exemplary embodiment provides a dial operation device for a vehicle that enables protrusion amounts of dial knobs of respective dial devices from a panel to be set to predetermined amounts, while saving costs by being able to use a plurality of dial devices having the same shape and the same structure. The dial operation device can include a plurality of dial devices each having a dial knob that turns and a dial element outputting a signal corresponding to a turned position of the dial knob, a plurality of plate-shaped or "planar" circuit boards divided for the respective dial devices on which the corresponding dial devices are mounted, wiring members electrically interconnecting the circuit boards, and a board supporting body having a panel provided with a plurality of through-holes in which the corresponding dial knobs of the respective dial devices are inserted, and for individually supporting the respective circuit boards in a state where the respective dial knobs protrude toward a front of the panel through the corresponding through-holes in the panel. The board supporting body supports the respective circuit boards in such a manner that one of at least two circuit boards among the circuit boards is positioned out of a plane where the other circuit board among the circuit boards lies.

In this device, the circuit board on which a plurality of dial operation devices are mounted is divided for the respective dial operation devices. Accordingly, it is possible to individually set relative positions of the respective dial operation devices with respect to the panel. Thus, by appropriately setting the relative positions of one circuit board with respect to another, it is possible to set protrusion amounts of the dial knobs of the respective dial operation devices with respect to the front of the panel while saving costs by using dial operation devices having the same shape and the same structure.

For example, it may be preferable for the board supporting body to support the respective circuit boards in such a manner that turning axes of the respective dial devices are parallel to one another, and that at least two dial devices are at different positions in a direction parallel to the turning axes.

In this device, even in circumstances where the panel rises and falls in a direction parallel to the turning axes so that at least two through-holes among the through-holes provided to the panel are at different positions in this direction, the appearance of the dial operation device when viewed from the panel side and ease of operation of the respective dial knobs are not degraded. In other words, the board supporting body can support the respective circuit boards on which the corresponding dial devices are mounted at different positions in the direction parallel to the turning axes, so that minimum protrusion amounts of the dial knobs of the respective dial devices toward the front of the panel through the through-holes have small differences in comparison with a case where the respective circuit boards are disposed along a same plane orthogonal to the direction specified above. The minimum protrusion amounts of the respective dial knobs therefore can be made equal, which in turn makes it possible to guarantee a satisfactory appearance and ease of dial operation.

Further, the board supporting body is also capable of supporting the respective circuit boards at positions at which the minimum protrusion amounts of the dial knobs of the respective dial devices from the surface of the panel are substantially equal to one another. Accordingly, the appearance of the device can be further enhanced.

Further, by connecting one circuit board to another with the wiring members, associated dial operation devices can cooperate with one another, such as in the related art in which a plurality of dial operation devices are mounted on a single circuit board.

For example, the dial operation device can be configured in such a manner that the circuit boards include a main board and one or more than one sub-board apart from the main board, the main board alone is provided with a communication portion that enables communications collectively between the main board and an external circuit provided on an outside of the dial operation device for the vehicle and between the sub-board and the external circuit, and the wiring member connecting the main board and the sub-board includes a signal line transmitting a signal for communications between the communication portion and a communication circuit provided to the sub-board. As with the device in the related art in which a plurality of dial devices are mounted on a single circuit board, communications between the main board and the external circuit, and between the sub-board and the external circuit, are enabled collectively via the communication portion with a more simple structure and wiring by providing the communication portion to only the main board alone, for example.

More specifically, it may be preferable that the communication portion includes a connector for an external connection that can be joined to a mating connector connected to the external circuit and a communication control circuit performing communication control collectively between the main board and the external circuit and between the sub-board and the external circuit.

Also, in an exemplary embodiment, only the main board may be provided with a power supply input portion collectively connecting the main board and the sub-board to a power supply circuit. In this embodiment, it may be sufficient that the wiring member connecting the main board and the sub-board includes a feed line supplying a power supply inputted from the power supply input portion to the sub-board. In a device configured in this manner, it is thus possible to supply a power supply from the power supply input portion to the main board, and further to the sub-board, with simple structure and wiring by providing the power supply input portion to only the main board, for example.

In this embodiment, for example, the connector for the external connection can also serve as the power supply input portion. Accordingly, the structure of the device can be further simplified.

The dial operation device as described herein with reference to the exemplary embodiment is useful as an operation device, for example, for an air-conditioning apparatus installed in a vehicle. For example, it is preferable that a dial device operated to adjust a condition (e.g., temperature or air volume) of air sent to a driver's seat from an air-conditioning apparatus and an element forming an operation device other than the dial device that contributes to another operation on the air-conditioning apparatus are mounted on the main board, while a dial device turned to adjust a condition of air sent to a seat other than the driver's seat from the air-conditioning apparatus is mounted on the sub-board.

In the dial operation device as described herein, the dial device for the driver's seat and elements forming other operation devices, which are frequently operated by the driver, can be mounted on the main board, and the communication portion described above can be concentrated on the main board. Consequently, it is thus possible to constitute a reasonable communication system among the circuit boards that is centralized on the main board.

The invention claimed is:

1. A dial operation device for a vehicle, comprising:
a plurality of dial devices each having a dial knob that turns and a dial element outputting a signal corresponding to a turned position of the dial knob;
a plurality of individual plate-shaped circuit boards for the respective dial devices, on which the corresponding dial devices are mounted;
wiring members directly connecting the plurality of circuit boards with each other; and
a board supporting body having a panel provided with a plurality of through-holes in which the corresponding dial knobs of the respective dial devices are inserted, and supporting the respective plurality of circuit boards individually in a state where the respective dial knobs protrude toward a front of the panel through the corresponding through-holes in the panel,
wherein the board supporting body supports the respective circuit boards in such a manner that one of at least two circuit boards among the plurality of circuit boards is positioned out of a plane in which other ones among the plurality of circuit boards lie, the board supporting body having a rear cover including a plurality of bosses having supporting surfaces supporting the plurality of circuit boards respectively, the supporting surfaces of the bosses being disposed at different positions along a direction parallel to turning axes of the respective dial devices.

2. The dial operation device for a vehicle according to claim 1, wherein
the board supporting body supports the respective plurality of circuit boards in such a manner that the turning axes of the respective dial devices are parallel to one another and that at least two dial devices are at different positions in the direction parallel to the turning axes.

3. The dial operation device for a vehicle according to claim 2, wherein
the panel rises and falls in the direction parallel to the turning axes so that at least two through-holes among the through-holes provided on the panel are at different positions in the direction parallel to the turning axes; and
the board supporting body supports the respective plurality of circuit boards on which the corresponding dial devices are mounted at different positions in the direction parallel to the turning axes so that protrusion amounts of the dial knobs of the respective dial devices from the through-holes are substantially equal.

4. The dial operation device for a vehicle according to claim 3, wherein
the board supporting body supports the respective plurality of circuit boards at positions at which the minimum protrusion amounts of the dial knobs of the respective dial devices from the corresponding through-holes are substantially equal to one another regardless of rise and fall of the panel.

5. The dial operation device for a vehicle according to claim 1, wherein
the plurality of circuit boards include a main board and one or more sub-boards;
the main board is provided with a communication portion that enables communications collectively between the main board and an external circuit provided outside of the dial operation device for a vehicle and between the one or more sub-boards and the external circuit; and
the wiring member connecting the main board and the one or more sub-boards includes a signal line transmitting a signal for the communications between the communication portion and a communication circuit provided on the one or more sub-boards.

6. The dial operation device for a vehicle according to claim 5, wherein
the communication portion includes a connector for an external connection with a mating connector connected to the external circuit, and a communication control circuit controlling communication between the main board and the external circuit and between the one or more sub-boards and the external circuit.

7. The dial operation device for a vehicle according to claim 5, wherein
the main board is provided with a power supply input portion collectively connecting the main board and the one or more sub-boards to a power supply circuit; and
the wiring member connecting the main board and the one or more sub-boards includes a feed line supplying a power supply inputted from the power supply input portion to the one or more sub-boards.

8. The dial operation device for a vehicle according to claim 7, wherein
the connector for an external connection further includes the power supply input portion.

9. The dial operation device for a vehicle according to claim 5, wherein
a dial device for adjusting a condition of air sent to a driver's seat from an air-conditioning apparatus installed in the vehicle and an element forming an operation device other than the dial device that contributes to another operation on the air-conditioning apparatus are mounted on the main board; and
a dial device for adjusting a condition of air sent to a seat other than the driver's seat from the air-conditioning apparatus is mounted on the one or more sub-boards.

10. The dial operation device for a vehicle according to claim 1, wherein
each of the plurality of dial devices have the same shape and structure.

11. The dial operation device for a vehicle according to claim 1, wherein
each of the wiring members has a connector portion mounted to a respective circuit board and a cable portion removably inserted into the connector portion.

* * * * *